A. BENEDICT.
WEATHER STRIP.
APPLICATION FILED JAN. 17, 1916.
1,182,626.
Patented May 9, 1916.
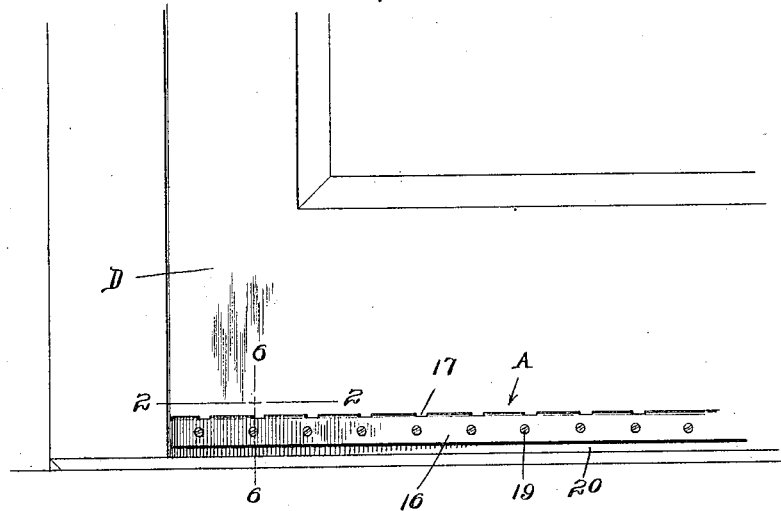
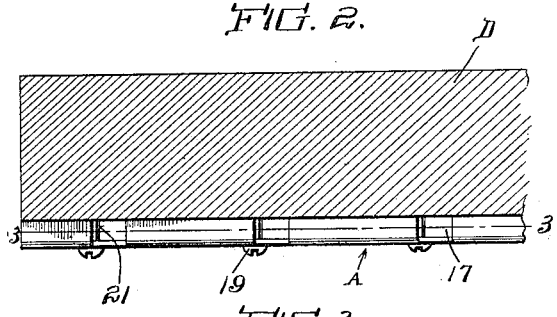
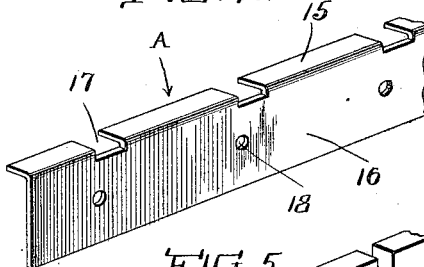
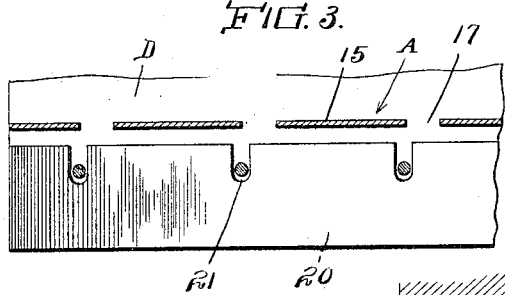
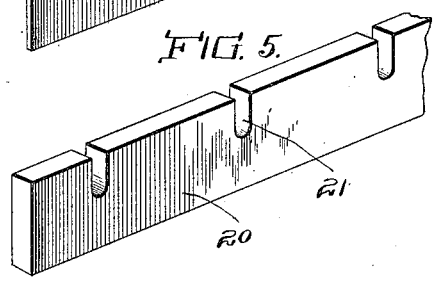
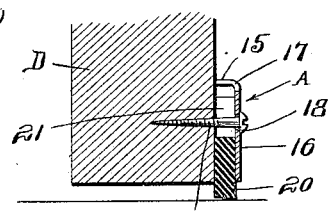
Witnesses
A. C. Newkirk
W. Bagger
Inventor
Austin Benedict,
By Victor J. Evans
Attorney

UNITED STATES PATENT OFFICE.

AUSTIN BENEDICT, OF MERRILL, WISCONSIN.

WEATHER-STRIP.

1,182,626.

Specification of Letters Patent.

Patented May 9, 1916.

Application filed January 17, 1916. Serial No. 72,609.

*To all whom it may concern:*

Be it known that I, AUSTIN BENEDICT, a citizen of the United States, residing at Merrill, in the county of Lincoln and State of Wisconsin, have invented new and useful Improvements in Weather-Strips, of which the following is a specification.

This invention relates to weather strips for doors, windows and the like, and it has particular reference to that class of weather strips in which a protecting strip of rubber or other appropriate material is adjustably mounted in a holder enabling said protecting strip to be advanced or adjusted to compensate for wear as well as in the initial mounting of the device.

The invention has for its object to produce a simple and improved holder with which the protecting strip is adjustably connected, means being provided whereby the protecting strip may be advanced and held in advanced position while the securing means are being tightened.

A further object of the invention is to produce a weather strip comprising an angular metallic holder, a protecting strip adjustable therein, and means for mounting the holder in position on a door or window and at the same time securing the protecting strip in position with respect to the holder.

A further object of the invention is to produce a weather strip comprising an angular metallic holder having notches or slots, and a flexible adjustable guard strip or protecting strip of rubber or other suitable material, the same being accessible through the slots or notches for the purpose of effecting proper adjustment thereof.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a front view, showing the improved weather strip mounted in position for operation on the lower part of a door. Fig. 2 is a sectional view taken on the line 2—2 in Fig. 1, the weather strip being shown in top plan. Fig. 3 is a sectional view taken on the line 3—3 in Fig. 2. Fig. 4 is a perspective view showing the holder. Fig. 5 is a perspective view showing a portion of the guard strip. Fig. 6 is a sectional view taken on the line 6—6 of Fig. 1.

Corresponding parts in the several figures are denoted by like characters of reference.

The holding member A of the improved device consists of a strip of sheet metal which is of suitable gage to be sufficiently rigid, said strip being bent to produce a top flange 15 lying substantially at right angles to the front portion or body portion 16 of the strip. The flange 15 is provided at intervals with notches 17, and the front or body portion 16 is provided with apertures 18 for the passage of headed screws 19. The screw holes 18 are preferably formed slightly out of registry with the notches 17, the reason for this arrangement being hereinafter set forth.

The guard strip or protecting strip 20, which may be made of rubber or other suitable material, is provided with vertical notches 21 for engagement with the fastening screws 19, said notches being spaced apart so as to register with the apertures 18. The strip 20 is of proper dimensions to be accommodated beneath the flange 15 between the front portion or body portion 16 and the door or other element D on which the device is mounted.

In assembling the improved device with a door or the like the holding member A is mounted on the door with the lower edge of the front portion or body portion 16 approximately in alinement with the lower edge of the door. The guard strip 20 is inserted beneath the flange 15 between the front portion or body portion 16 and the door, with the notches 21 in engagement with the screws 19. By tightening the latter the guard strip will be compressed between the bottom edges of the door and the holding strip, and it will thus be securely held. By loosening the screws the guard strip may be properly adjusted to compensate for wear and to completely obstruct any existing space or opening between the bottom edge of the door and the door sill. It is obvious that the improved device may be applied to the sides and tops of doors, as well as to window sashes in the manner already described. To adjust the guard strip after loosening the screws 19, a tool such as a screw driver may be inserted through the slots 17 to engage the top edge of the guard strip and to push the latter as far outward with respect to the bottom edge of the holding member as may be required. The slots 17 being out of alinement with the screw holes 18 and with the vertical notches 21 in the strip 20, it follows that the solid top edge of said strip will be exposed beneath the slot 17, thus enabling the strip to be readily manipulated in the manner described.

Having thus described the invention, what is claimed as new, is:—

A weather strip comprising an angular metallic holder having a narrow top flange and a relatively wide front or body flange, said top flange being provided with spaced notches, and said front flange having apertures slightly out of alinement with said notches, in combination with a guard strip having spaced notches alining with the apertures in the front wall of the holder, and fastening members extending through the apertures in the holder and through the notches of the guard strip.

In testimony whereof I affix my signature in presence of two witnesses.

AUSTIN BENEDICT.

Witnesses:
Wm. J. Kyht,
Thomas Calder.

Copies of this patent may be obtained for five cents each, by addressing the "Commissioner of Patents, Washington, D. C."